May 19, 1931.  E. D. TILLYER  1,806,318
DIAGNOSTIC INSTRUMENT
Filed May 2, 1928
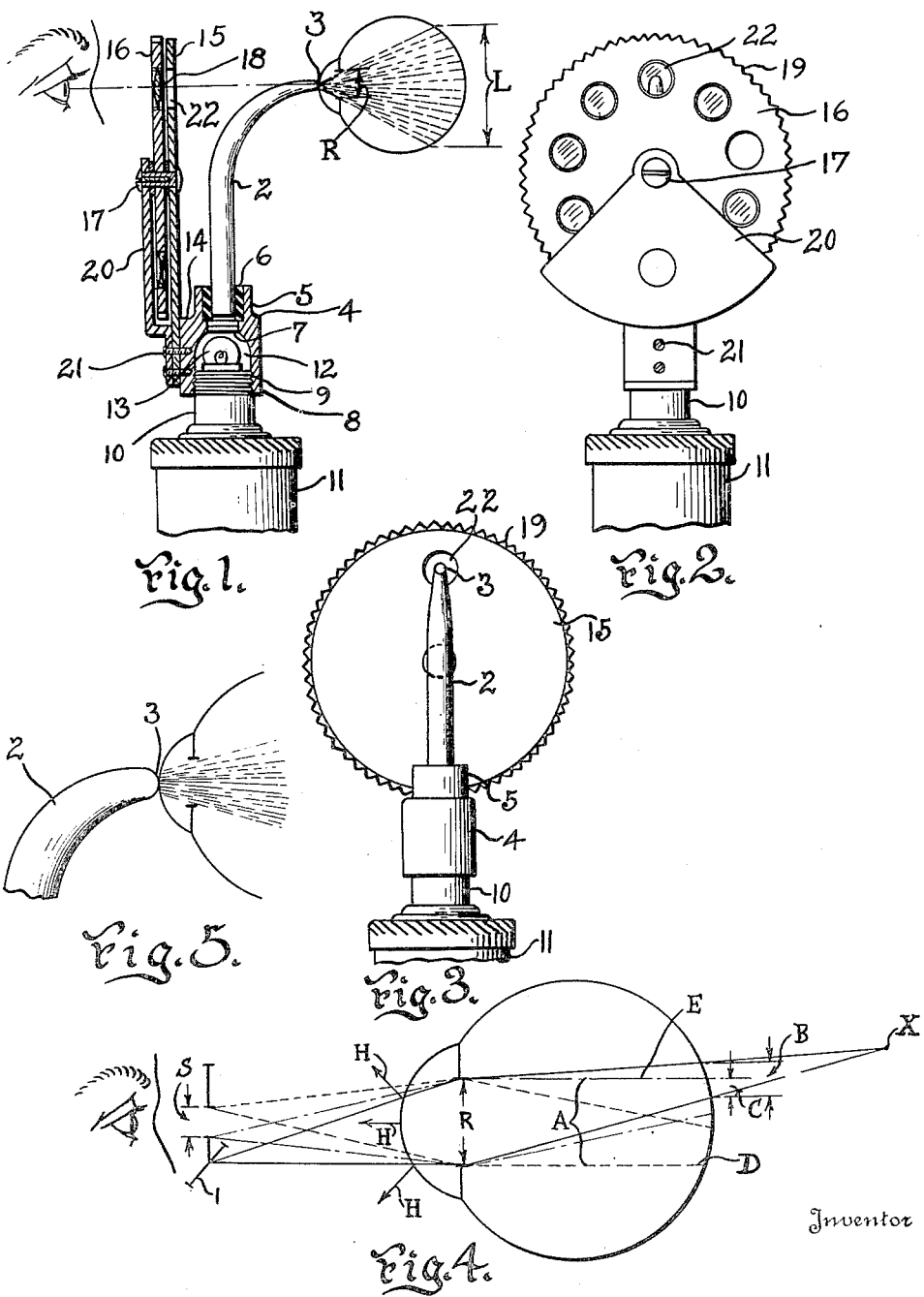
Inventor
Edgar D. Tillyer
By Harry H. Styll
Attorney Patented May 19, 1931

1,806,318

UNITED STATES PATENT OFFICE

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

DIAGNOSTIC INSTRUMENT

Application filed May 2, 1928. Serial No. 274,489.

This invention relates to diagnostic instruments and has particular reference to an ophthalmic instrument such as an ophthalmoscope with illuminating means adapted to immediately approach the eye of the patient without injury thereto.

The principal object of this invention is to provide illuminating means in such an instrument that may have practically optical contact with the eyeball so that the usual reflected glare from the eyeball will be eliminated and the point of illumination will be such that the observer may see around it without confusion or loss of the visual field all without injury to the eyeball.

Another object of the invention is to provide a head or attachment for the illuminating handle of a diagnostic instrument which shall comprise a lens disc ophthalmoscope and illuminating means that may be approached to contact with the eyeball whereby the head may be used interchangeably with other heads for different types of diagnostic instruments to be used with the said handle.

Another object of the invention is to increase the illuminated field in the patient's eye and also increase the amount of the illuminated field that may be seen by the observer.

Another object of the invention is to provide an illuminant that may be brought in contact with the eye of the patient without danger of injury thereto.

Another object of the invention is to provide simple, inexpensive and efficient means for producing such an ophthalmoscope with an illuminant that may be brought in contact with the eye of the patient.

Another object of the invention is to provide a flexible or resilient coupling for the lens of the illuminant which is to be brought in contact with the eye of the patient so that undue pressure may not be brought to bear on the patient's eye.

Other objects and advantages of the invention will become apparent from the following description taken in connection with the accompanying drawings and it will be understood that I may make any modifications in the specific arrangements and construction of the parts without departing from the spirit of the invention as set forth in the accompanying claims. The preferred form of the invention only is shown by way of illustration and I, therefore, do not wish to be limited to the exact details of construction and arrangement of parts as set forth herein.

Referring to the drawings in which similar characters of reference are employed to denote corresponding parts throughout:

Fig. 1 is a partial elevation in cross section;

Fig. 2 is a partial elevation of the operator's side of the instrument;

Fig. 3 is a partial elevation of the patient's side of the instrument;

Fig. 4 is a diagrammatic view illustrating the illumination of the patient's eye under examination.

Fig. 5 is a fragmentary enlarged diagrammatic view showing the illuminant in contact with the eye of the patient.

Referring to Figure 4, which shows the illumination of the eye with the usual reflector, it will be noted first that there is a reflected glare from the surface of the eyeball indicated in the diagram by the arrows marked "H". This is due to the separation of the eyeball from the mirror. It will also be noted that the mirror 1 reflecting the light through the opening of the eye R will illuminate the section of the eye B, the rays of light entering through the opening R coming to a point X. The distance B, therefore, represents that portion of the retina which is illuminated by the reflector 1 of the ophthalmoscope. The observer or oculist, however, will not see all of this illuminated area of the retina of the patient's eye because he is looking through an opening S in the ophthalmoscope. The upper limits of his vision will be indicated by the dot and dash line E and the lower limit by the dot line D, but from the point D to the edge of the illuminated field B is dark and, therefore, he cannot see anything. The only part the oculist can see is the portion C of the illuminated field B. It is the object of my invention to increase the amount of illuminated field to a point such as A that the oculist can see.

Referring to Fig. 1, I show a fused quartz illuminant 2 as the source of illumination for the eye instead of the usual mirror reflector 1; this quartz crystal 2 is tapered down and terminates with a curved ball face 3 where it comes in contact with the eye of the patient, the curved face 3 blending with the sides of the illuminant 2 with out shoulder or edge will not cut or injure the eye ball when in contact therewith. The illuminating light is transmitted by the ball face 3 of the quartz lens 2. It will be seen that the light entering the eye through the opening in the eye R will illuminate the retina for a section L which is a very great increase in the field over that shown in Fig. 4. The ball point of the illumination at 3 touching the eye prevents any glare reflections such as are present at H in Figure 4. Also the quartz lens or illuminant being reduced to almost a point at the ball faced end 3 does not shut off the vision of the observer as he can see around it and can see illuminated the field A as indicated in Fig. 4.

I mount my quartz lens 2 in a hollow cap 4 having a retaining flange 5 and between the retaining flange and the quartz lens 2 I insert a resilient holding band 6 which may be made of rubber or other yielding material cemented or otherwise held in place. This resilient mounting of the quartz lens 2 provides a yielding mounting for the lens so that undue strain may be relieved on the eyes of the patient when the ball faced end 3 comes in contact therewith. On the inside of the cap 4 I mount a heat absorbing lens 7, which may be made of any heat absorbing glass, such as a glass containing ferrous iron salts. This will prevent the lenses of the eye from over heating. At the lower end of the cap 4 I have provided a flange 8 having the screw threads 9 fitting the support 10 of a diagnostic handle 11 provided with a light source, such as an electric battery or a cord connection for the usual current supply. In the chamber 12 of the cap 4 I have provided an electric lamp 13 which has suitable electric connections with the handle 11.

On the cap 4 is a boss 14 carrying a support plate 15, to which is rotatably mounted the lens carrier plate 16 of an ophthalmoscope being pivoted on the pivot 17. The plate 16 is fitted with the usual ophthalmoscope lenses 18 and the plate 16 has a knurled edge 19 for rotating it about the pivot 17. A second support plate 20 is secured to the first plate 15 by the fasteners 21 and this plate 20 also supports the pivot 17. There is a sight opening 22 through the plates 15 and 16 through which the observer looks and the point 3 of the lens 2 is in alignment with the sight opening 22.

It will be apparent from the foregoing description that the ophthalmoscope head being carried on the cap 4 with the lens 2 may be readily detached from the handle portion and that other types of diagnostic instruments may be attached to the handle making it possible with this arrangement to provide this type of ophthalmoscope and illuminating lens as a fitting of an ordinary diagnostic set.

The operation of the instrument is as follows: the current is turned on by the switch on the handle, which illuminates the bulb 13, which in turn illuminates the lens 2 carrying the point of illumination to the ball faced end 3 which is approached closely to the patient's eye, in fact in contact with the eyeball. The observer looks through the opening 22 as in the case of the ordinary ophthalmoscope; the lens 2 being mounted in the flexible connection 6 is yielding to avoid undue pressure on the eye of the patient. The heat absorbing lens 7 may or may not be used, as desired, but if used will tend to keep the eye lenses cool and prevent them from heating. The lens 2 is preferably made of fused quartz, although other substances may be used.

The handle 11 may be of the ordinary battery form or it may be one attached to a cord with a socket for connection to a source of electric current.

From the foregoing description it will be seen that I have provided an illuminating means for an ophthalmoscope wherein the eye may be illuminated without danger of injury thereto and without reflections from the ball of the eye, and wherein the field of the illuminated portion of the eye which is visible to the observer has been carefully increased over the prior art instruments. It will also be seen that I have provided simple, efficient and inexpensive means for carrying out all the objects of the invention as herein set forth.

Having described my invention, I claim:

1. In a device of the character described, a handle, a source of light on the handle, a member attached to the handle and extending over the source of light, said member having a light opening therethrough and a lens seat therein and an extending arm having a sight opening therethrough, an elongated rod lens in the lens seat having a curved tapered upper portion terminating in a small rounded end portion in alignment with the sight opening, the cross section of the lens in alignment with the sight opening being of such a dimension as to permit sight of the eye around the lens.

2. In a device of the character described, a handle, a source of light on the handle, a member attached to the handle and extending over the source of light, said member having a light opening therethrough and a lens seat therein and an extending arm having a sight opening therethrough, an elongated rod lens in the lens seat having a curved tapered upper portion terminating in a small rounded end portion in alignment with the sight opening, the cross section of the lens in alignment with the sight opening being of such a dimension as to permit sight of the eye around the lens, and a resilient member between the lens and lens seat.

3. In a device of the character described, a handle, a source of light on the handle, a member attached to the handle and extending over the source of light, said member having a light opening therethrough and a lens seat therein and an extending arm having a sight opening therethrough, an elongated rod lens in the lens seat having a curved tapered upper portion terminating in a small rounded end portion in alignment with the sight opening, the cross section of the lens in alignment with the sight opening being of such a dimension as to permit sight of the eye around the lens, and a filter lens between the light and the rod lens.

4. In a device of the character described, a handle, a source of light on the handle, a member attached to the handle and extending over the source of light, said member having a light opening therethrough and a lens seat therein and an extending arm having a sight opening therethrough, an elongated rod lens in the lens seat having a curved tapered upper portion terminating in a small rounded end portion in alignment with the sight opening, the cross section of the lens in alignment with the sight opening being of such a dimension as to permit sight of the eye around the lens, a filter lens between the light and the rod lens and a resilient member between the lens and lens seat.

5. In a device of the character described, a member having a source of light, an elongated rod lens aligned with the light and adapted to transmit light coming from the light source, the end of the lens distant from the light source being curved and reduced in cross section, and an arm extending from the member having the source of light, said arm having a sight opening therethrough in alignment with the end of the lens distant from the light source.

6. In a device of the character described, a member having a source of light, a member over the source of light having a light opening therethrough and a lens seat therein and an extending arm having a sight opening therethrough, an elongated rod lens in the lens seat having a curved tapered upper portion terminating in a small rounded end portion in alignment with the sight opening, the cross section of the lens in alignment with the sight opening being of such a dimension as to permit sight of the eye around the lens through the sight opening.

EDGAR D. TILLYER.